US010281551B2

(12) United States Patent
Ai et al.

(10) Patent No.: US 10,281,551 B2
(45) Date of Patent: May 7, 2019

(54) COMPOUND EYE LASER TRACKING DEVICE

(71) Applicant: Luminit LLC, Torrance, CA (US)

(72) Inventors: Jun Ai, Torrance, CA (US); Fedor Dimov, Torrance, CA (US); Russell Kurtz, Torrance, CA (US)

(73) Assignee: Luminit LLC, Torrance, CA (US)

( * ) Notice: Subject to any disclaimer, the term of this patent is extended or adjusted under 35 U.S.C. 154(b) by 232 days.

(21) Appl. No.: 15/085,662

(22) Filed: Mar. 30, 2016

(65) Prior Publication Data

US 2016/0291115 A1    Oct. 6, 2016

Related U.S. Application Data

(60) Provisional application No. 62/140,191, filed on Mar. 30, 2015.

(51) Int. Cl.
*G01S 3/786*    (2006.01)
*G01S 3/781*    (2006.01)
*F41G 7/22*    (2006.01)

(52) U.S. Cl.
CPC .............. *G01S 3/786* (2013.01); *F41G 7/226* (2013.01); *F41G 7/2293* (2013.01); *G01S 3/781* (2013.01)

(58) Field of Classification Search
CPC .......... G01S 3/786; G01S 3/785; G01S 3/782; G01S 3/783; G01S 3/784; G01S 3/781; F41G 7/226; F41G 7/2213; F41G 7/2293
See application file for complete search history.

(56) References Cited

U.S. PATENT DOCUMENTS

| | | | | |
|---|---|---|---|---|
| 4,094,577 A | * | 6/1978 | Spitz | G02B 5/32 359/19 |
| 4,286,760 A | * | 9/1981 | Couderc | F41G 7/2213 244/3.16 |
| 4,479,717 A | * | 10/1984 | Cornillault | G01B 11/026 250/227.11 |
| 4,585,948 A | * | 4/1986 | Schneider | G01J 1/04 250/208.1 |
| 4,625,108 A | * | 11/1986 | Nestel | G02B 6/04 250/226 |
| 4,674,874 A | * | 6/1987 | Halldorsson | G01S 3/782 250/203.3 |
| 4,778,990 A | * | 10/1988 | Laughlin | G01J 1/04 250/227.28 |
| 4,893,025 A | * | 1/1990 | Lee | B25J 13/086 250/208.3 |

(Continued)

*Primary Examiner* — John R Lee
(74) *Attorney, Agent, or Firm* — Husch Blackwell LLP

(57) ABSTRACT

The Compound Eye Laser Illumination Seeker is a tracking system used to guide items to point at a laser-illuminated target, with the illumination being either pulsed or modulated at either a specific rate or within a range of rates. The device comprises a multiaperture compound receiver optics to collect the signal, a set of light guides to combine the received light into light representing individual angular sectors and redirect it to detectors whose output represents the illumination signal in that quadrant, a spectral filter, an angle filter, the set of detectors, and processing electronics. The output is an electronic signal indicating the angular difference between the pointing direction of the signal and the pointing direction of the tracking device.

16 Claims, 2 Drawing Sheets

(56) References Cited

U.S. PATENT DOCUMENTS

| | | | | | |
|---|---|---|---|---|---|
| 4,965,453 | A * | 10/1990 | Hoschette | | F41G 7/2253 244/3.16 |
| 5,015,844 | A * | 5/1991 | Cole | | G01S 3/784 250/227.24 |
| 5,023,440 | A * | 6/1991 | Kuppenheimer, Jr. | | G01S 3/782 250/203.6 |
| 5,243,179 | A * | 9/1993 | Bjorkman | | G01S 3/781 250/206.2 |
| 5,517,019 | A * | 5/1996 | Lopez | | G02B 19/0085 250/208.1 |
| 5,606,434 | A * | 2/1997 | Feldman | | G02B 27/4288 359/15 |
| 5,920,337 | A * | 7/1999 | Glassman | | H04N 7/181 250/208.1 |
| 6,507,392 | B1 * | 1/2003 | Richards | | F41G 7/226 244/3.16 |
| 6,987,258 | B2 * | 1/2006 | Mates | | H04N 5/23232 250/208.1 |
| 7,185,845 | B1 * | 3/2007 | Hartman | | F42B 10/46 244/3.1 |
| 7,276,681 | B2 * | 10/2007 | Alexander | | F41G 7/001 244/3.13 |
| 7,286,295 | B1 * | 10/2007 | Sweatt | | G02B 3/0037 348/340 |
| 7,587,109 | B1 * | 9/2009 | Reininger | | G02B 3/0037 385/116 |
| 7,742,151 | B2 * | 6/2010 | Krasutsky | | F41G 7/008 356/4.01 |
| 7,839,550 | B1 * | 11/2010 | Billmers | | G02B 5/18 359/15 |
| 8,259,291 | B2 * | 9/2012 | Taylor | | F41G 7/008 356/3.01 |
| 8,766,808 | B2 * | 7/2014 | Hogasten | | H01L 27/14609 340/632 |
| 2002/0031295 | A1 * | 3/2002 | Sasaki | | G02B 6/12007 385/24 |
| 2005/0093757 | A1 * | 5/2005 | Kiernan, Jr. | | F41G 7/008 343/781 CA |
| 2005/0279917 | A1 * | 12/2005 | Barrett | | G06K 9/58 250/208.1 |
| 2006/0236721 | A1 * | 10/2006 | Franck | | B23K 26/0823 65/61 |
| 2007/0237490 | A1 * | 10/2007 | Reininger | | G02B 6/06 385/147 |
| 2009/0314929 | A1 * | 12/2009 | Lee | | G02B 6/02033 250/227.28 |
| 2010/0001119 | A1 * | 1/2010 | Lindgren | | F41G 7/226 244/3.16 |
| 2012/0001058 | A1 * | 1/2012 | Luke | | G01J 1/4228 250/208.2 |
| 2012/0013967 | A1 * | 1/2012 | Kim | | G02B 26/0825 359/290 |
| 2014/0117260 | A1 * | 5/2014 | Woida-O'Brien | | G02F 1/01 250/503.1 |
| 2014/0231650 | A1 * | 8/2014 | Streuber | | H01L 27/14625 250/349 |
| 2014/0312161 | A1 * | 10/2014 | Eli | | F41G 7/008 244/3.16 |
| 2015/0177381 | A1 * | 6/2015 | Yap | | G01S 17/42 356/138 |
| 2015/0253111 | A1 * | 9/2015 | Caplan | | F41G 3/145 244/3.11 |
| 2015/0268345 | A1 * | 9/2015 | Eli | | F41G 7/008 356/5.01 |
| 2015/0325723 | A1 * | 11/2015 | Shi | | H01L 31/0324 257/437 |
| 2015/0377590 | A1 * | 12/2015 | Roncone | | F41G 7/008 244/3.16 |
| 2016/0161587 | A1 * | 6/2016 | Caplan | | F41G 7/008 250/203.2 |
| 2016/0185447 | A1 * | 6/2016 | Miralles | | G05D 1/12 701/3 |
| 2016/0216075 | A1 * | 7/2016 | Trail | | F42B 5/02 |
| 2016/0291115 | A1 * | 10/2016 | Ai | | G01S 3/786 |
| 2016/0291442 | A1 * | 10/2016 | Ai | | G02F 1/3534 |
| 2017/0041534 | A1 * | 2/2017 | Xia | | H04N 5/23238 |
| 2017/0102264 | A1 * | 4/2017 | Harder | | G01J 1/0411 |

* cited by examiner

COMPOUND EYE LASER TRACKING DEVICE

FIELD OF THE INVENTION

This invention is in the field of optics, and more particularly deals with tracking and sensing devices.

BACKGROUND OF THE INVENTION

There is a need for a wide field-of-view compound eye optics for semi-active laser (SAL) spot-tracking missile seekers to provide precision guidance to targets, for illuminated image tracking, and for image sensing, all in the presence of elevated background illumination. An ideal device to meet these needs would provide a wide field of view (>10° cone angle) without the need for moving parts. The device would include spectral and angle filtering in the optical portion, plus electrical noise reduction. The background illumination could include the sun in the FOV and within 1° of the target. The illumination could, for example, be a near-infrared (NIR), repetitively pulsed laser. The device would produce an electronic signal to enable a tracking system to follow the target. Such a signal could, for example, be a simple set of voltages or digital data, indicating whether or not the target is centered in the FOV of the device and, if it is not centered, indicating the direction off center where the target is located.

Current SAL seekers, for example, use single aperture optics and suffer from a limited FOV (about 10°), which is insufficient to search for and acquire the target. The seekers also suffer from relatively high ambient noise, both electronically and in the optical portion; they are therefore inefficient in blocking bright sunlight. Illuminated image-tracking and -sensing devices suffer from the same difficulties.

SUMMARY OF THE INVENTION

The Compound Eye Laser Missile Seeker of the subject invention is a tracking system used to guide items to strike a laser-illuminated target. The laser illuminator is modeled as a short-pulse laser operating at 1.064 µm, operating at a repetition rate of at least 100 Hz. The CELMS accurately tracks the illuminated spot even when the direction of the sun is very close to the direction to the illuminated spot, and initially finds the illuminated spot in a 50° cone field of view (FOV). The final CELMS fits within a cylinder whose diameter is 2.75 in. (70 mm) and whose length is roughly 6 in. (150 mm), and it does not require moving parts. The CELMS output is two dc voltages, one to guide the item in elevation, the other in azimuth.

The subject invention includes a method of tracking an optical signal in the presence of optical noise, having the steps of collecting a signal with a lens array, filtering the signal to select specific wavelengths or wavelength ranges, filtering the signal to limit the angular field of view of each lens, directing the signal to one or more photodetectors, and processing the output(s) of the photodetector(s) so that signals are produced which describe the angular difference between the pointing direction of the signal and the pointing direction of the tracking device. The lens array may be mounted to a curved surface and is biometrically inspired.

Further, a holographic system may be used as a spectral and/or angular filter and may be a substrate-guided holographic filter. The method of directing the optical signal to one or more photodetectors may be with an optical fiber bundle, and can be a light guide. Filtering the signal to limit the angular field of view may involve the light guide, which may select specific wavelengths with an optical bandpass filter, may be formed from a combination of a shortpass filter and a longpass filter. The photodetector can be a single detector whose output indicates the position of the light on the detector and may be a plurality of detectors. The electronics may include noise filtering. The electrical output signal may be analog or digital.

CONCISE DESCRIPTION OF THE DRAWINGS

DETAILED DESCRIPTION OF THE DRAWINGS

Figure 1:
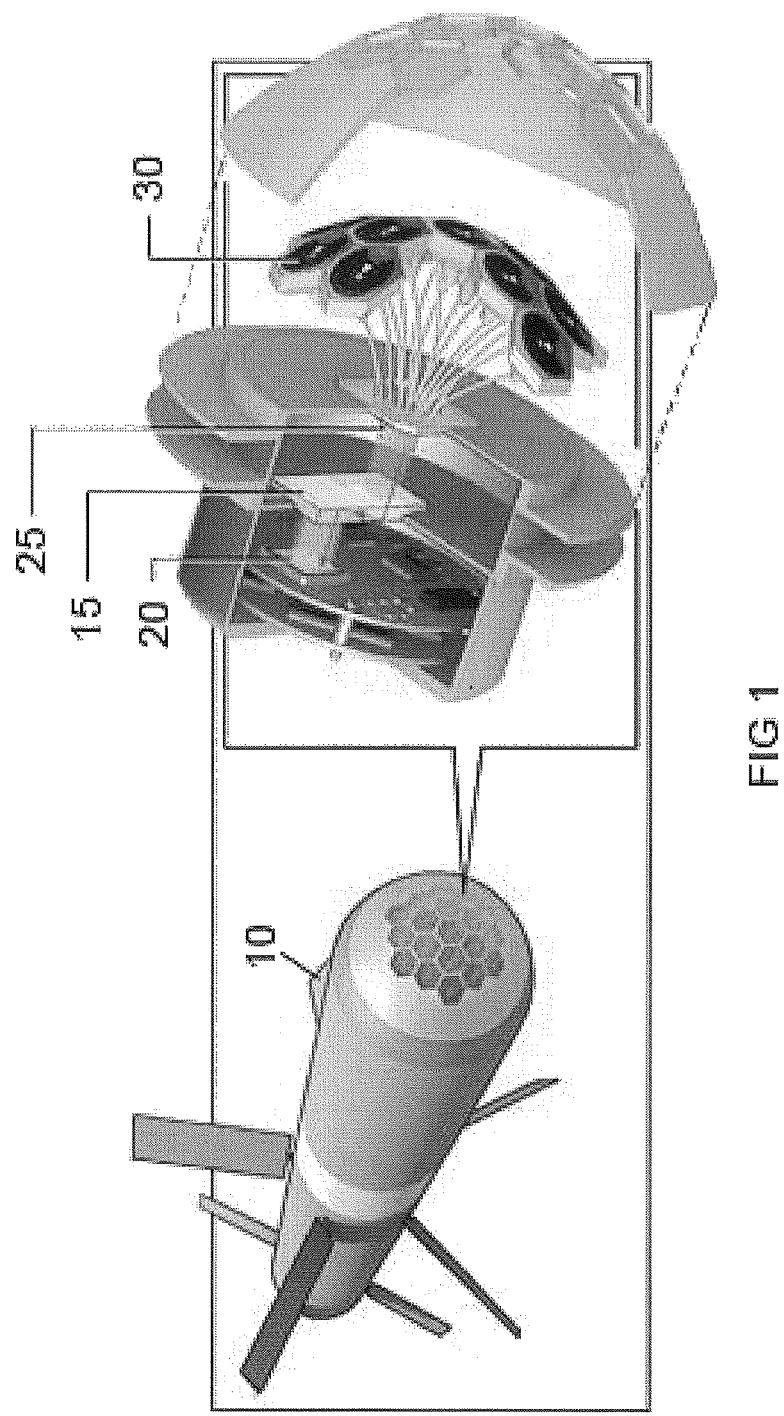
FIG. 1 shows a Compound Eye Laser Missile Seeker.

The subject invention resolves these issues, being an innovative wide field-of-view, compound eye, laser illumination seeker 10, based on multiaperture compound receiver optics (MACRO) with a spectral and angle filter. The subject invention includes a MACRO, made of a lens array 30 aligned with a light-guide array 25, an angle filter 15, a spectral filter 15, a set of detectors 20 (typically four), and electronics and software FIG. 1). In the configuration of a missile cruising to the target area, an external designator sends laser pulses to mark the target, and the MACRO receives the diffused reflection light from the target and creates a laser spot image. The angle and spectral filters, combined with light guides, fiber optic bundles, and/or holographic optical elements, directs the target laser beam to the detectors, which act as signal position sensors. The angle and spectral filters eliminate most extraneous light, such as bright background illumination, before it reaches the detectors. The electronics further filter the output of the detectors, then process the position-sensitive signals and calculate the azimuth and elevation corrections. These correction signals are sent to the direction control subsystem of the missile, which implements the corrections and steers the missile so that the laser spot moves from the edge to the center in the FOV to track the target. In the sensing and fixed target tracking configurations, the azimuth and elevation signals are used to direct the sensor, keeping it pointed at the target. The MACRO emulates a biologically-inspired compound eye, enabling the subject invention to provide a constant, wide FOV, eliminating the need for a gimbal.

The subject invention uses angular- and spectrally-selective filters, which eliminate the interference of solar light and allow simple integration with a quad detector 50, a position detector, or several individual detectors, resulting in a compact device package that can be easily implemented within a small volume. A substrate-guided holographic (SGH) relay 45 can be used as a combined angular and spectral filter. The SGH comprises two holographic optical element (HOE) lenses integrated on a flat glass substrate The two HOE lenses can be fabricated in a holographic photopolymer film and can offer over 80% throughput (diffraction efficiency) with an out-of-band rejection ratio about 60 dB or OD 6. Only photons that satisfy both the Bragg wavelength and Bragg angle simultaneously are diffracted by the SGH filter and reach the detector. Other photons that have different incident angles or wavelengths, such as bright sunlight, are rejected by the SGH filter, and will not reach the detector; thus, a low noise and high signal-to-noise ratio (SNR) can be achieved. If the SGH filter is not included, separate angle and spectral filters must be used. The angle filter can be, for example, a light guide design that restricts the FOV of each lens of the MACRO. The spectral filter can be, for example, a narrowband interference filter.

An ideal device should have the following properties:

Capable of tracking an illumination laser, which is pulsed or modulated and operates at a specific wavelength Capable of rejecting a bright, broadband background source within 1° from the target Capable of rejecting a bright, broadband illumination of the target Wide field of view >10° full cone angle No moving parts.

Figure 2:
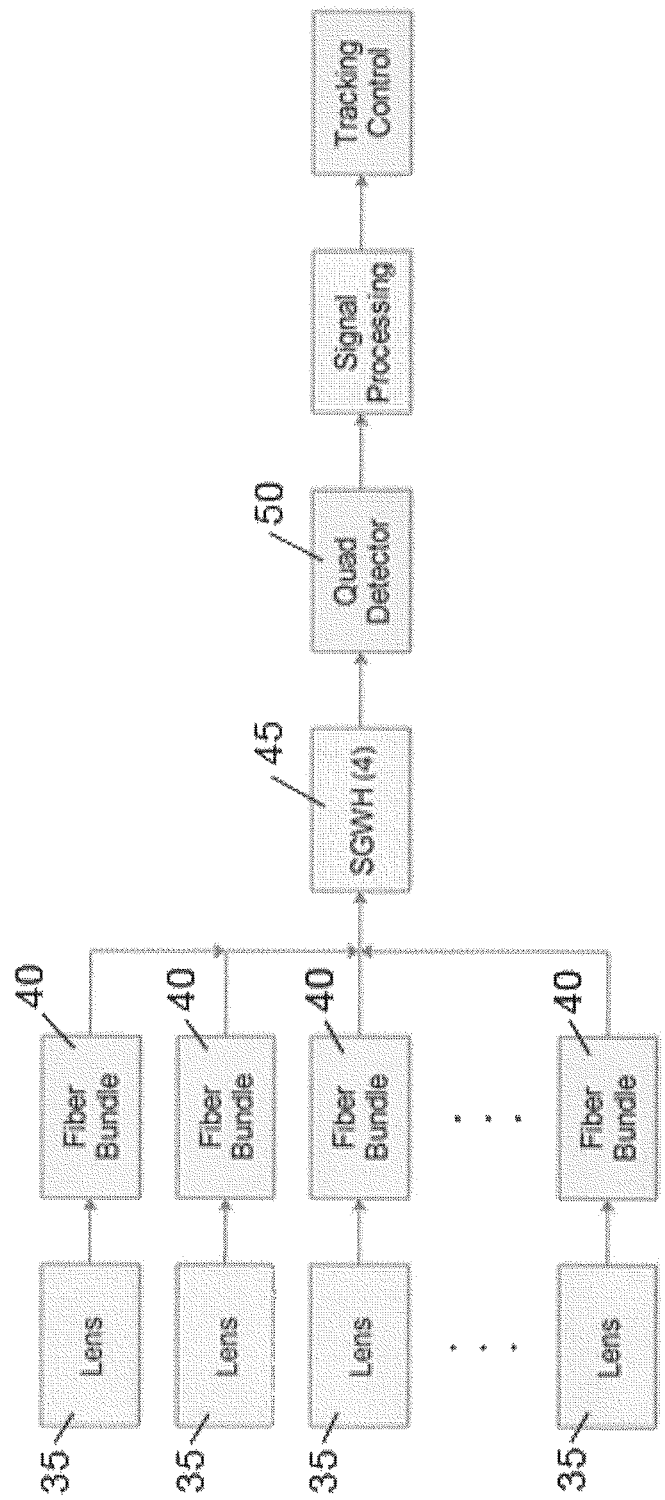
FIG. 2 shows Block Diagram of the Operation of the subject invention.

An example implementation is configured to guide a missile to a designated target. This example includes a MACRO with a plurality of lenses 35. Each lens has a small FOV (6.25° in this example). The lenses are arranged on a surface that is curved so that the normal to the center of each lens is pointed in the direction, relative to the other lenses, of its portion of the FOV. The lenses are arrayed in quadrants, aligned to the direction change capabilities of the missile (for example, up-left, up-right, down-left, and down-right to provide azimuth and elevation signals). The individual lens FOVs are tiled in such a way as to cover the entire FOV. In this example, with each lens covering 6.25° and the FOV being 50° full cone angle, the diameter of the MACRO will contain eight lenses. To fill a FOV of 50° full cone angle, a total of 52 lenses are required in this example (FIG. 1-2).

In this example, all the light received by an individual quadrant is collected by a set of light guides or fiber bundles 45. The configuration of the light guide or fiber bundle restricts the individual lens FOV to its designated 6.25° section. The light from the 13 lenses in each 25° pie-shaped quadrant is combined into a single output. The light then passes through a spectral filter 50, which is an SGH in this example, and is directed to a single detector covering that quadrant. Comparison of the responses of the responses of the four detectors, each representing one quadrant, are then compared to determine the correction values to be sent to the direction control electronics.

The MACRO is a multilens array mounted on a curved surface, where the angular deviation of each lens from the center of the MACRO FOV is such that the lens is pointing exactly in the direction centered in the lens FOV assigned to that lens. This results in a significant reduction in aberration when compared to an individual lens with the diameter and FOV of the MACRO. In addition, since the MACRO uses thinner lenses than an individual lens with the same size and MACRO FOV, it is much lighter than an individual lens.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

The invention claimed is:

1. A method for tracking an optical signal in the presence of optical noise, comprising A tracking system having no moving parts, said tracking system having a lens array for collecting the signal;

filtering the signal with a substrate guided holographic relay for selecting specific wavelengths or wavelength ranges, and for limiting the angular field of view of each lens;

directing the signal to one or more photodetectors;

processing the output of the one or more photodetectors so that a correction signal is produced which describe an angular difference between a pointing direction of the correction signal and a pointing direction of a tracking device, and sending the correction signal to a direction control system for implementation.

2. The method of claim 1 wherein the lens array is mounted to a curved surface.

3. The method of claim 1 wherein the filtering steps comprises utilizing two holographic optical elements integrated on a flat glass substrate.

4. The method of claim 1 wherein the step of directing the signal to one or more photodetectors utilizes an optical fiber bundle.

5. The method of claim 1 wherein the step of directing the signal to one or more photodetectors utilizes a light guide.

6. The method of claim 5 wherein filtering the signal to limit angular field of view is with the light guide.

7. The method of claim 1 wherein filtering the signal to select specific wavelengths is with one or more optical bandpass filters.

8. The method of claim 7 wherein each optical bandpass filter is formed from a combination of a shortpass filter and a longpass filter.

9. The method of claim 1 wherein the one or more photodetector comprises a single detector whose output indicates the position of a light on the detector.

10. The method of claim 1 wherein the one or more photodetector comprises a plurality of detectors.

11. The method of claim 1 further including noise filtering.

12. The method of claim 1 wherein output of the one or more photodetector is analog.

13. The method of claim 1 wherein the output of the one or more photodetector is digital.

14. A compound eye laser illumination seeker, comprising multi aperture compound receiver optics having no moving parts, the optics having a lens array, the lens array being aligned with a light guide array, a spectral and angle filter for eliminating extraneous light and sending a signal to a set of detectors; a processor for processing the signal to calculate a correction signal, said spectral and angle filter comprising a holographic optical lens integrated on a flat transparent substrate and a direction control system for receiving the correction signal and implementing the correction signal.

15. The compound eye laser illumination seeker of claim 14 wherein the set of detectors comprise four photo detectors.

16. The method of claim 1 wherein the step of filtering the signal with a substrate guided holographic relay utilizes a combined angular and spectral filter.

* * * * *